US012140287B1

(12) United States Patent
Filho et al.

(10) Patent No.: US 12,140,287 B1
(45) Date of Patent: Nov. 12, 2024

(54) LAMP ASSEMBLY INCORPORATING DEPTH DETECTION

(71) Applicant: Ford Global Technologies, LLC, Dearborn, MI (US)

(72) Inventors: Ricardo Filho, Lauro de Freitas (BR); Anderson Dal Zotto, Salvador (BR); Eric Santos, Feira de Santana (BR); Edson Hiroshi Otuka, Lauro de Freitas (BR)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/139,039

(22) Filed: Apr. 25, 2023

(51) Int. Cl.
*B60Q 1/14* (2006.01)
*B60Q 1/00* (2006.01)
*F21S 41/13* (2018.01)
*F21S 41/663* (2018.01)
*F21V 23/04* (2006.01)
*G01S 7/481* (2006.01)
*G01S 17/931* (2020.01)

(52) U.S. Cl.
CPC .......... *F21S 41/663* (2018.01); *B60Q 1/0023* (2013.01); *B60Q 1/1415* (2013.01); *F21S 41/13* (2018.01); *F21V 23/0471* (2013.01); *G01S 7/4813* (2013.01); *G01S 17/931* (2020.01)

(58) Field of Classification Search
CPC ...... F21S 41/663; F21S 41/13; B60Q 1/1415; B60Q 1/0023; B60Q 1/04; B60Q 1/20; G01S 17/931; G01S 7/4813; G01S 7/481; F21V 23/0471
See application file for complete search history.

(56) References Cited

U.S. PATENT DOCUMENTS

| 10,486,586 B1 | 11/2019 | Ghannam et al. |
| 2001/0006468 A1* | 7/2001 | Hamm ..................... B60Q 1/18 362/512 |
| 2017/0220876 A1* | 8/2017 | Gao ........................ G06V 10/82 |
| 2019/0275923 A1 | 9/2019 | Fushimi et al. |

(Continued)

FOREIGN PATENT DOCUMENTS

DE 102015007172 A1 2/2016

OTHER PUBLICATIONS

Fraunhofer-Gesellschaft, LiDAR and radar sensors—space-saving headlight installation, Oct. 4, 2022 retrieved Mar. 21, 2023 from https://techxplore.com/news/2022-10-lidar-radar-sensorsspacesaving-headlight.html.

(Continued)

*Primary Examiner* — Omar Rojas Cadima
(74) *Attorney, Agent, or Firm* — Frank Lollo; Price Heneveld LLP

(57) ABSTRACT

A lamp assembly for a vehicle includes a housing. The lamp assembly also includes an outer lens operably coupled with the housing to define a chamber therebetween. A light source is disposed in a first portion of the chamber and is configured to emit visible light through the outer lens to a region exterior to the vehicle. The lamp assembly further includes a LiDAR module disposed in a second portion of the chamber and facing the outer lens. The LiDAR module is configured to capture distance information based on infrared light reflected from the region exterior. The second portion is vertically spaced from the first portion.

15 Claims, 8 Drawing Sheets

(56) References Cited

U.S. PATENT DOCUMENTS

2019/0283658 A1* 9/2019 Furui .................. B60Q 1/0023
2020/0377165 A1* 12/2020 Rienmueller ....... F21V 23/0442
2022/0229183 A1   7/2022 Chang et al.

OTHER PUBLICATIONS

Lumotive and ZKW Group Jointly Demonstrate Vehicle Headlight with Integrated Functional Lidar at CES 2022, Jan. 6, 2022.

* cited by examiner

LAMP ASSEMBLY INCORPORATING DEPTH DETECTION

FIELD OF THE DISCLOSURE

The present disclosure generally relates to a lamp assembly that incorporates depth detection and, more particularly, to a vehicle headlight assembly that incorporates illumination and detection components.

BACKGROUND OF THE DISCLOSURE

Vehicles may have exterior detection components and exterior illumination components.

SUMMARY OF THE DISCLOSURE

According to a first aspect of the present disclosure, a lamp assembly for a vehicle includes a housing. The lamp assembly also includes an outer lens operably coupled with the housing to define a chamber therebetween. A light source is disposed in a first portion of the chamber and is configured to emit visible light through the outer lens to a region exterior to the vehicle. The lamp assembly further includes a LiDAR module disposed in a second portion of the chamber and facing the outer lens. The LiDAR module is configured to capture distance information based on infrared light reflected from the region exterior. The second portion is vertically spaced from the first portion.

Embodiments of the first aspect of the present disclosure can include any one or a combination of the following features:
- an inner lens disposed between and separating the first and second portions;
- the light source is a headlamp for the vehicle;
- a bezel between the housing and the outer lens and defining a first cavity overlaying the light source and a second cavity overlaying the LiDAR module;
- the bezel defines a groove disposed between the first and second cavities and receiving the inner lens;
- the first cavity is disposed below the second cavity;
- the first cavity is disposed above the second cavity;
- the outer lens includes a substantially flat portion aligned with the LiDAR module;
- the LiDAR module is configured to emit and receive the infrared light through the substantially flat portion to scan the region exterior;
- a controller electrically coupled with the LiDAR module and configured to filter depth information of the region exterior captured by the LiDAR module;
- the light source is configured to selectively operate between in a low-beam mode and a high-beam mode to project the visible light through a first region of the outer lens aligned with the first portion of the chamber, and wherein the LiDAR module is configured to receive the infrared light through a second region of the outer lens separate from the first region;
- the second region is aligned with the second portion;
- the first region is vertically and laterally aligned with the first portion and the second region is vertically and laterally aligned with the second region;
- a positioning controller communicatively coupled with the light source and configured to communicate a signal to adjust a position of the light source.

According to a second aspect of the present disclosure, a lamp assembly for a vehicle includes a housing and an outer lens operably coupled with the housing to define a chamber therebetween. A light source is disposed in a first portion of the chamber and is configured to emit visible light through the outer lens to a region exterior to the vehicle. A LiDAR module is disposed in a second portion of the chamber and facing the outer lens. The LiDAR module is configured to capture distance information based on infrared light reflected from the region exterior. The second portion is disposed above the first portion. The light source is configured to project a beam of the visible light through a first region of the outer lens. The LiDAR module has a field of view intersecting with and defining a second region of the outer lens that is separate from the first region.

Embodiments of the second aspect of the present disclosure can include any one or a combination of the following features:
- the light source is configured to selectively operate between in a low-beam mode and a high-beam mode to project the visible light through a first region of the outer lens aligned with the first portion of the chamber, and wherein the LiDAR module is configured to receive the infrared light through a second region of the outer lens separate from the first region;
- the second region is aligned with the second portion;
- the first region is vertically and laterally aligned with the first portion and the second region is vertically and laterally aligned with the second region; and a controller electrically coupled with the LiDAR module and configured to filter depth information of the region exterior captured by the LiDAR module.

According to a third aspect of the present disclosure, a lamp assembly for a vehicle includes a housing and an outer lens operably coupled with the housing to define a chamber therebetween. A light source is disposed in a first portion of the chamber and is configured to emit visible light through the outer lens to a region exterior to the vehicle. A LiDAR module is disposed in a second portion of the chamber and facing the outer lens. The LiDAR module is configured to capture distance information based on infrared light reflected from the region exterior. A bezel is between the housing and the outer lens and defines a first cavity overlaying the light source and a second cavity overlaying the LiDAR module. The second portion is disposed above the first portion.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
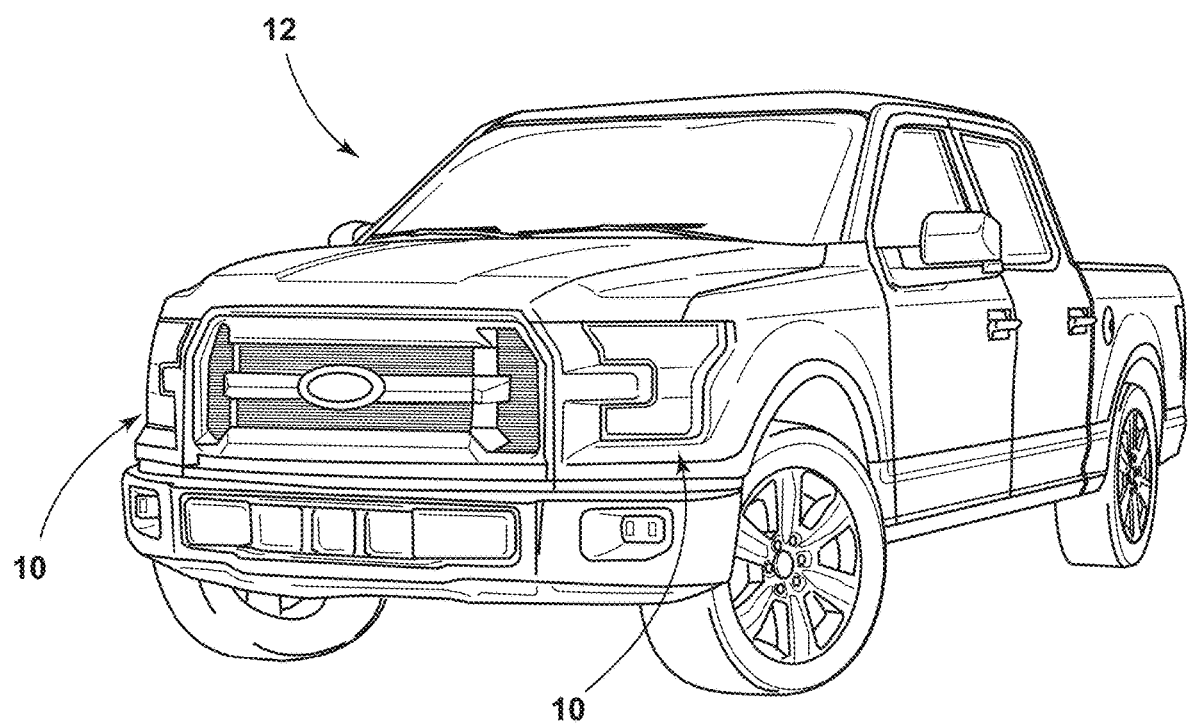
FIG. 1 is a perspective view of a vehicle incorporating a pair of lamp assemblies in the form of headlamp assemblies according to one aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a lamp assembly incorporating depth detection. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In general, the lighting and detection arrangement described herein may provide for enhanced space utilization for a headlight assembly. As lighting techniques and hardware allow for more lighting power from a smaller space within the headlight assembly, headlight assemblies have available space to house other components related to exterior environment detection. Further, due to the properties of lensing and other transparent/semi-transparent covers of the headlight for optical transmittance, the sensors implemented in the headlight may further provide for enhanced detection techniques.

Referring generally to FIGS. 1-8, reference numeral 10 generally designates a lamp assembly for a vehicle 12. The lamp assembly 10 is exemplarily an automotive headlight assembly that illuminates a region exterior 14 to the vehicle 12 in front of the vehicle 12. The lamp assembly 10 includes a housing 16 and an outer lens 18 operably coupled with the housing 16 to define a chamber 20 therebetween. The chamber 20 may be separated into one or more portions 22, 24, such as a first portion 22 and a second portion 24. For example, the lamp assembly 10 may have a stacked orientation, with an upper part 26 and a lower part 28. In such an example, the upper and lower parts 26, 28 may house components that serve different functions, such as lighting in one of the parts and depth sensing in the other of the parts. For example, the lamp assembly 10 has a light source 30 disposed in the first portion 22 of the chamber 20 and configured to emit visible light through the outer lens 18 to the region exterior 14 to the vehicle 12.

A LIDAR module 32 is disposed in the second portion 24 of the chamber 20 and faces the outer lens 18. For example, the LIDAR module 32 may include a projection surface 34 (e.g., a lens) through which the infrared light passes, and the projection surface 34 of the lens may face the outer lens 18. In this way, the infrared light may be received in a head-on fashion without incorporation of mirrors to reflect the light toward the LiDAR module 32. The LiDAR module 32 configured to capture distance information based on infrared light reflected from the region exterior 14. The second portion 24 is vertically spaced from the first portion 22. For example, the LiDAR module 32 may be disposed above the light source 30, or vice versa. In either example, the visible light presented by the light source 30 may be limited from interfering with the infrared light detected by the LiDAR module 32.

Referring now to FIG. 1, the vehicle 12 may be a car, a truck, a boat, an aircraft, or any other vehicle that incorporates exterior lighting to illuminate the region exterior 14 to the vehicle 12. In the present example, the lamp assembly 10 is positioned to project light in a vehicle-forward direction. The lamp assembly 10 may incorporate a two-story design, as will be described further below. For example, the lamp assembly 10 may have an over-under arrangement with the LiDAR module 32 and the light source 30.

Figure 2:
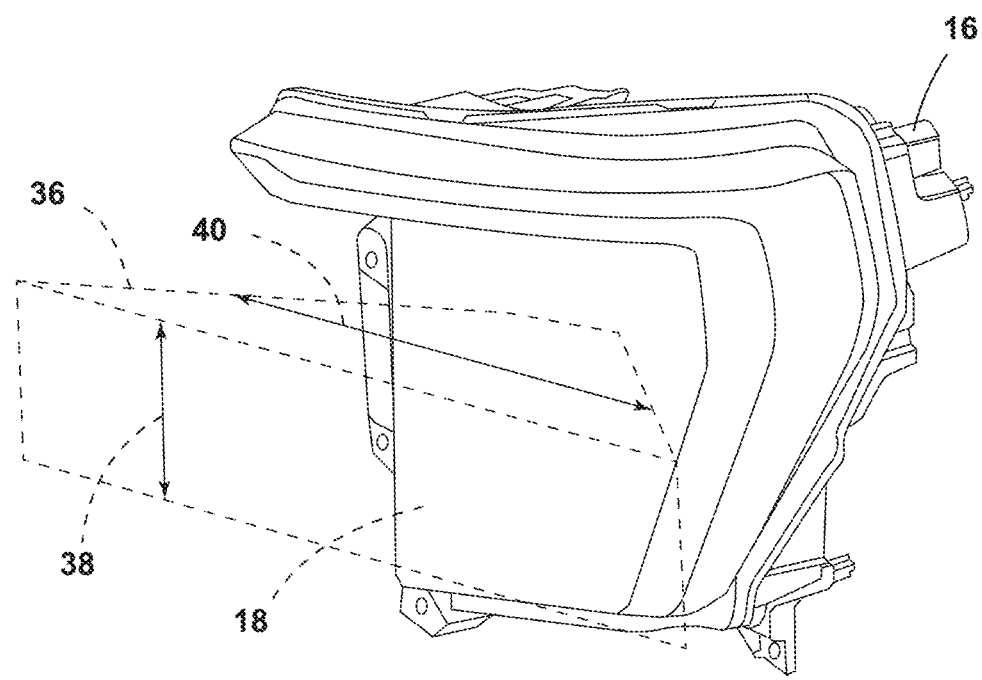
FIG. 2 is a front perspective view of one of the lamp assemblies of FIG. 1 and demonstrating a field of view for a LiDAR module in the lamp assembly.
Figure 3:
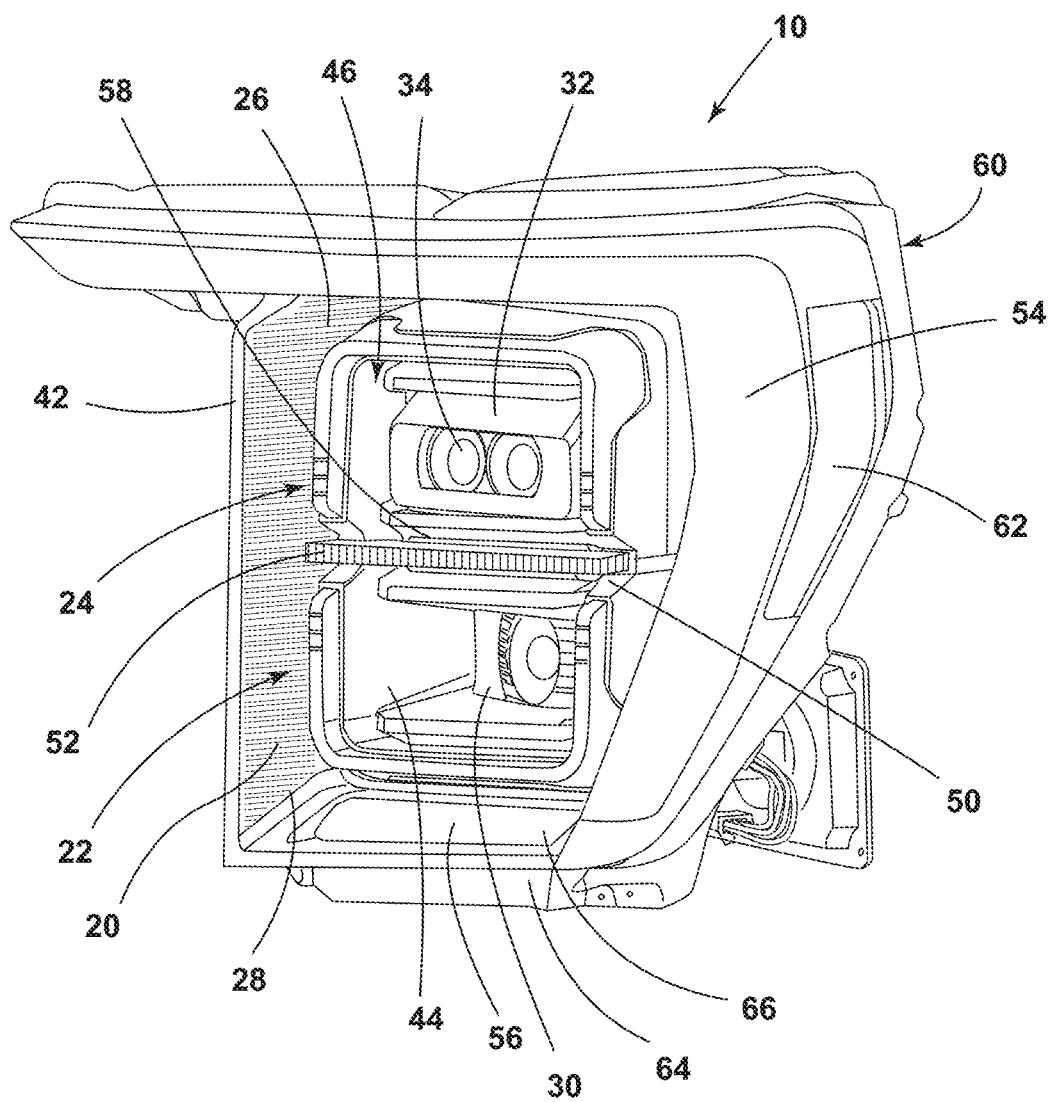
FIG. 3 is a front perspective view of the lamp assembly of FIG. 2 having an outer lens of the lamp assembly removed demonstrating a chamber of the lamp assembly.
Figure 4:
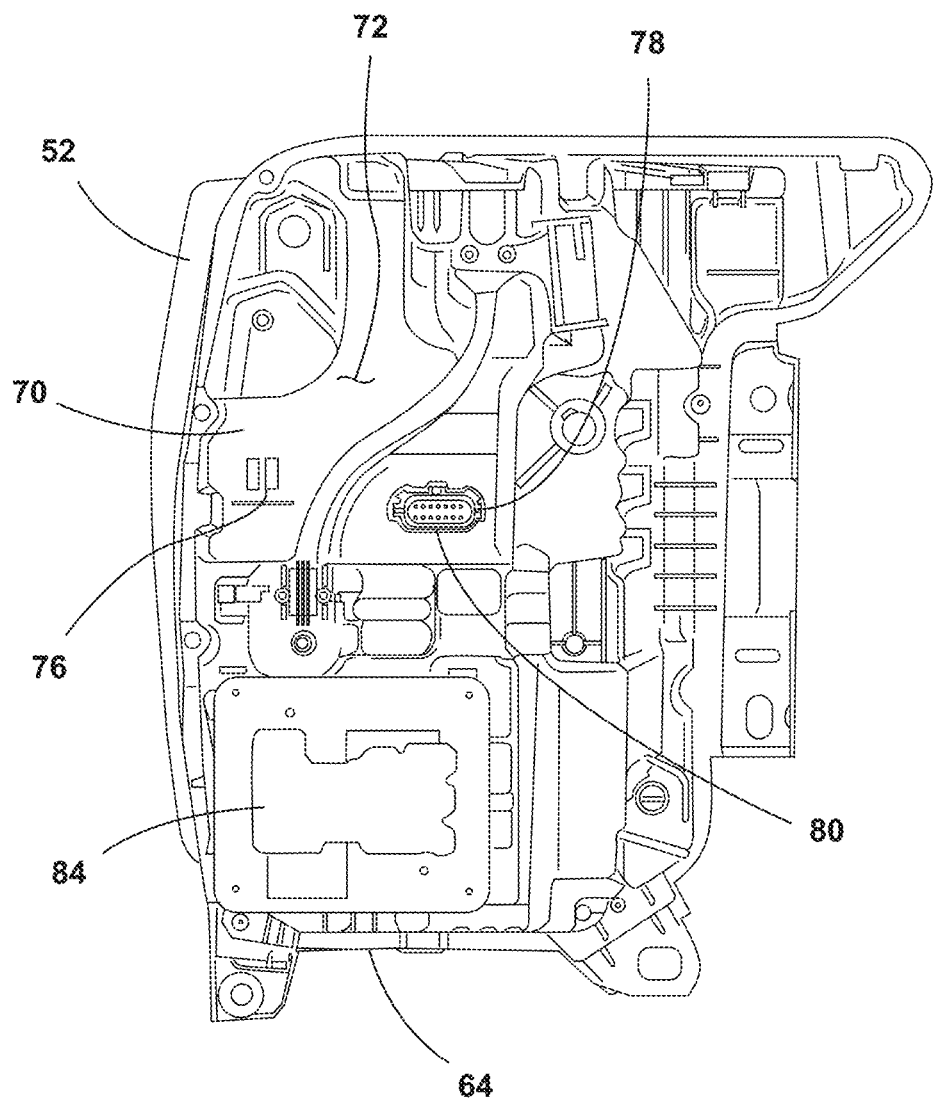
FIG. 4 is a rear plan view of the lamp assembly of FIG. 2.

Referring now to FIGS. 2-3, the LiDAR module 32 may have a field of view 36 that, at the outer lens 18, is separate from light beams emitted by the light source 30. For example, the light source 30 may be configured to selectively operate between a low-beam mode and a high-beam mode to project the visible light through a first region of the outer lens 18 aligned with the first portion 22 of the chamber 20. The field of view 36 includes a vertical range 38 of between −15° and 15° From a central axis of the field of view 36 and a horizontal range 40 of between −45° and 45° From the central axis. The field of view 36 intersects with and defines the second region of the outer lens 18.

The LiDAR module 32 may be configured to receive the infrared light through a second region of the outer lens 18 separate from the first region. The first region is vertically and laterally aligned with the first portion 22, and the second region is vertically and laterally aligned with the second region. By spacing the LiDAR module 32 from the light source 30, heat distribution within the lamp assembly 10 may be reduced, and light interference may be limited from reception at the LiDAR module 32.

The infrared light emitted and received by the present LiDAR module 32 may have a wavelength in the range of between approximately 780 nanometers (nm) and 1700 nm. In some examples, the wavelength of the LiDAR is preferably in the range of between 900 nm and 1650 nm. In other examples, the wavelength of the LiDAR is preferably between 1500 nm and 1650 nm. In some examples, the wavelength of the LiDAR is preferably at least 1550 nm. It is contemplated that the particular wavelength/frequency employed by the LiDAR module 32 may be based on an estimated distance range for capturing the depth information. For example, for shorter ranges (e.g., between 1 m and 5 m) the LiDAR may operate with a greater wavelength of light (e.g., greater than 1000 nm). The LiDAR module 32 of the present disclosure may be configured to output light, in the form of a laser, at a wavelength of at least 1550 nm while the motor 52 rotates the optics 54 to allow mapping an area. In some examples, the LiDAR modules 32 of the present disclosure are configured to emit light having a wavelength of at least 1650 nm. The present LiDAR module 32 may be either a single point—and—reflect module or may operate in a rotational mode. In rotational mode, the LiDAR module 32 may measure up to 360 degrees based on the rate of rotation, which may be between 1 and 100 Hertz or may be at least 60 rotations per minute (RPM) in some examples. In some examples, the LiDAR module 32 is configured with a fixed field of view 36 outlined above (90° horizontal and 30° vertical).

Referring now to FIGS. 2-6, the lamp assembly 10 includes a bezel 42 between the housing 16 and the outer lens 18. The bezel 42 may be fastened with the housing 16. The bezel 42 defines a first cavity 44 overlaying the light source 30 and a second cavity 46 overlaying the LiDAR module 32 lamp assembly 10. For example, the cavities 44, 46 may extend along a depth of the bezel 42 in a vehicle-rearward direction. In general, the bezel 42 is disposed in the chamber 20. The bezel 42 also defines a groove 50 disposed between the first and second cavities 44, 46. The groove 50 extends along the depth and along a width of the bezel 42. The groove 50 is positioned vehicle-forward relative to the light source 30 and the LiDAR module 32.

The lamp assembly 10 includes at least one inner lens 52, 54, 56 disposed behind the outer lens 18. The at least one inner lens 52, 54, 56 includes a first inner lens 52, a second inner lens 54, and a third inner lens 56. The first inner lens 52 is disposed between and separates the first and second portions 22, 24. For example, the first inner lens 52 may be supported by a carrier 58 disposed in the groove 50. The carrier 58 is configured to receive the first inner lens 52. The second inner lens 54 operably couples with the housing 16 along a peripheral portion 60 of the housing 16. For example, the second inner lens 54 may be C-shaped to at least partially outline the lamp assembly 10. A side reflector 62 is disposed on the inner lens 52, 54, 56.

Still referring to FIGS. 2-6, the third inner lens 56 is disposed at a lower end 64 of the lamp assembly 10. A lower reflector 66 is disposed behind the third inner lens 56 and provides for reflecting light projected on the lamp assembly 10.

The housing 16 may be an open shell that is fastened with and couples with the bezel 42 and the at least one inner lens 52, 54, 56. The open shell includes a back wall 70 that extends between a rear surface 72 and a front surface. The front surface is housed within the chamber 20, and the rear surface 72 faces away from the chamber 20. The back wall 70 defines a vent 76 providing fluid communication to/from the chamber 20. The housing 16 also defines a hole 78 in the back wall 70 that receives a socket 80. The socket 80 may be employed for interfacing between wiring 82 in the chamber 20 and wiring outside of the chamber 20. A lighting driver module 84 is mounted to the back wall 70 for powering the light source 30 at various power levels. The lighting driver module 84 includes a lighting circuit that is configured to control an array of light-emitting diodes (LEDs) of the light source 30. For example, the lighting driver module 84 may include various electronics, including processors, controllers, and any power electronics.

Figure 5:
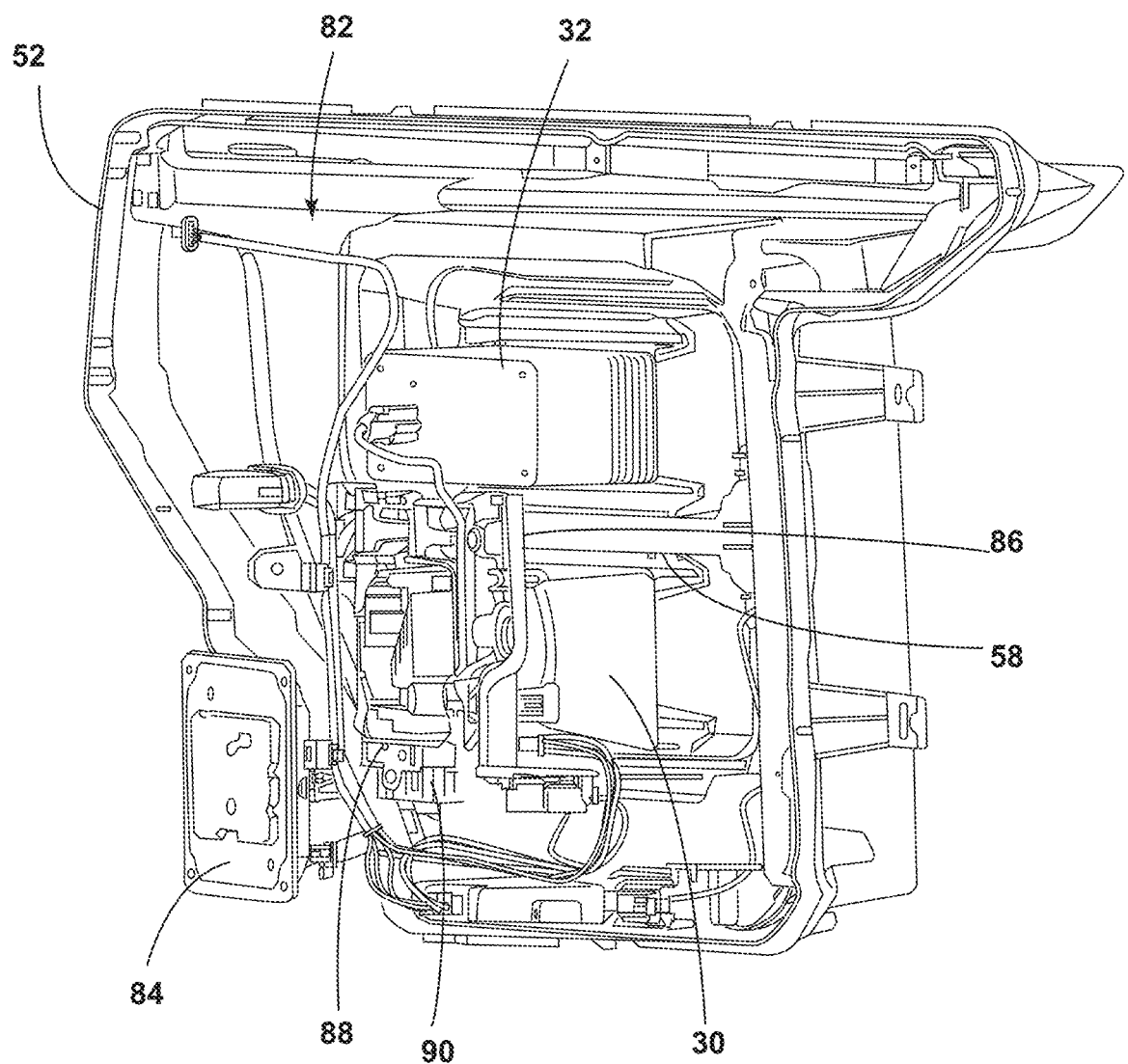
FIG. 5 is a rear perspective view of the lamp assembly of FIG. 2 with a housing of the lamp assembly removed to illustrated wiring and electrical components of the lamp assembly.

Referring now to FIG. 5, a mounting bracket 86 is operably coupled with the bezel 42 for securing the light source 30 and the LiDAR module 32. The mounting bracket 86 is configured to support the light source 30 in the first cavity 44 and the LiDAR module 32 in the second cavity 46. Mounted to a bottom 88 of the mounting bracket 86 is a LiDAR controller 90 for the LiDAR module 32. The LiDAR controller 90 is electrically coupled with the LiDAR module 32 via the wiring 82 in the chamber 20.

Figure 6:
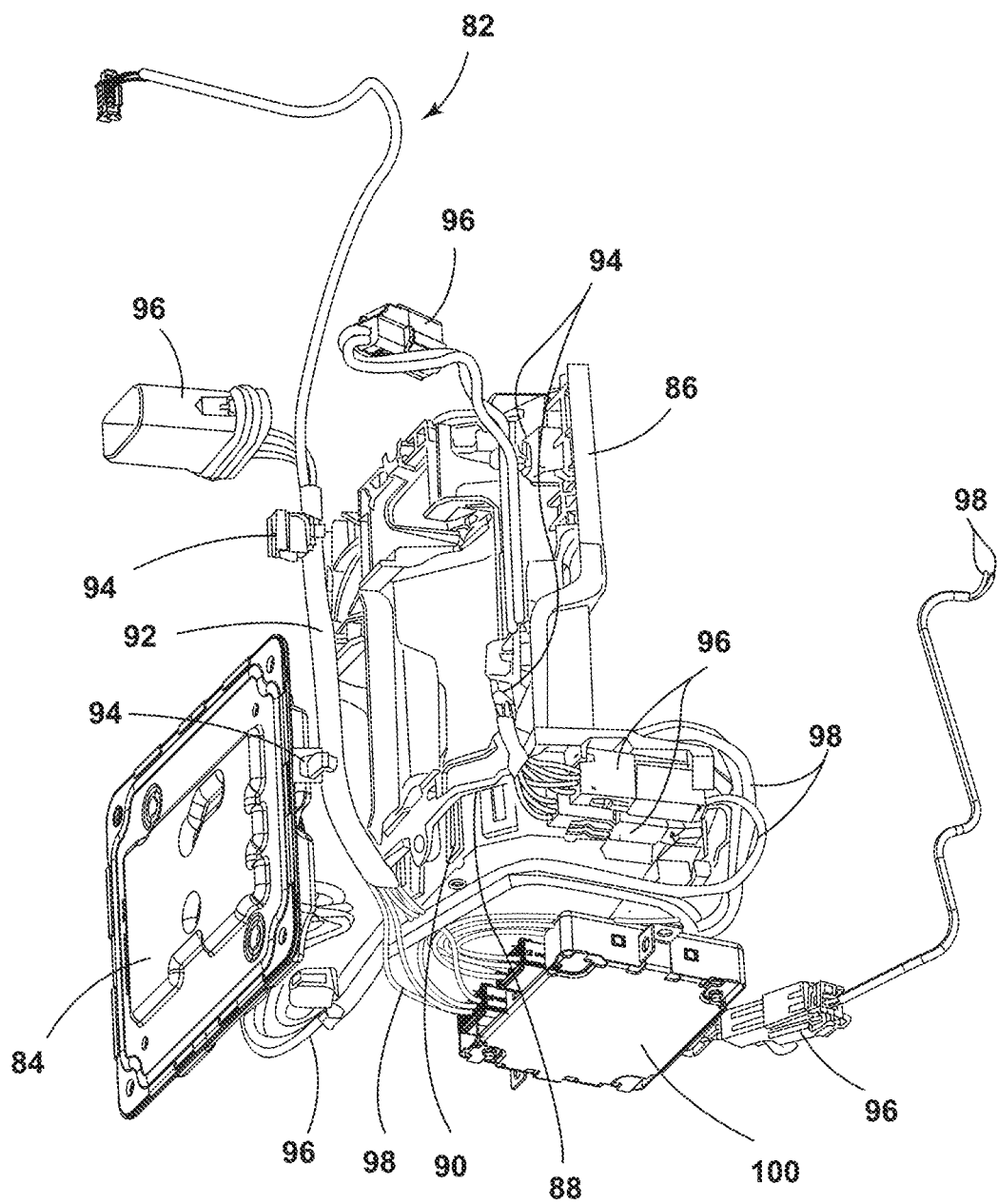
FIG. 6 is a rear perspective view of the lamp assembly of FIG. 2 demonstrating electrical components of the lamp assembly.

Referring now to FIGS. 5 and 6, the wiring 82 in the chamber 20 may include a wire harness 92 having a plurality of fasteners 94 to mount the wire harness 92 with the housing 16 or other structural features of the lamp assembly 10 (e.g., the mounting bracket 86). The wire harness 92 is coupled with the socket 80 and includes a plurality of connectors 96 that electrically couple one or more conductors 98 with the lighting module, the LiDAR controller 90, and a positioning controller 100. The positioning controller 100 is configured to adjust a position of the light source 30. For example, the light source 30 may include a motor or another electro-mechanical actuator for adjusting an angle of the light projected by the light source 30. In some implementations, the light source 30 is part of an adaptive driving beam (ADB) system configured to emit both high—and low-beam light patterns. In general, the lighting driver module 84 and the positioning controller 100 may be configured to control the light emitted from the light source 30.

Figure 7A:
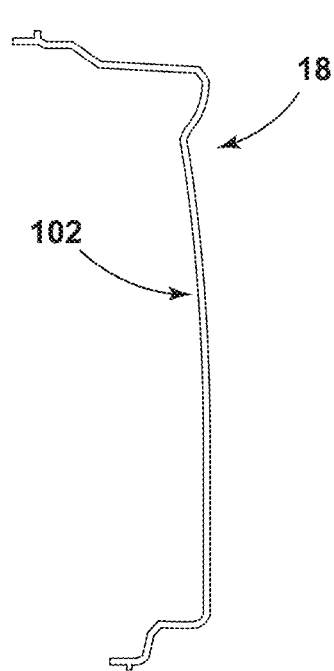
FIG. 7A is an exemplary cross-sectional view of an outer lens of a lamp assembly according to one example.
Figure 7B:
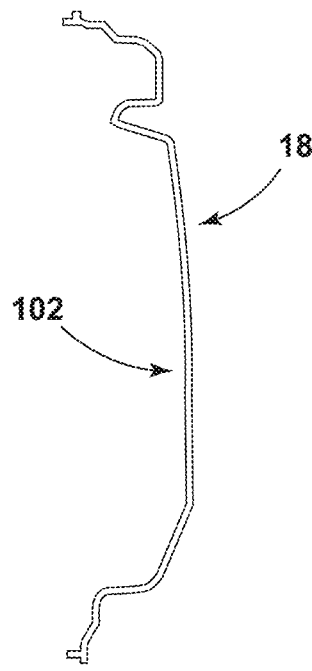
FIG. 7B is an exemplary cross-sectional view of an outer lens of a lamp assembly according to another example.
Figure 7C:
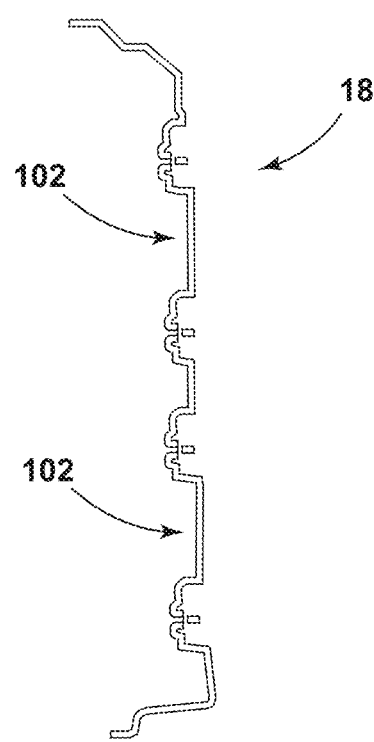
FIG. 7C is an exemplary cross-sectional view of an outer lens of a lamp assembly according to another example.

Referring now to FIG. 7A-7C, various examples of the outer lens 18 for the lamp assembly 10 are demonstrated to illustrate a substantially flat portion 102 of the outer lens 18 aligned with the LiDAR module 32. The LiDAR module 32 is configured to emit and receive the infrared light through the substantially flat portion 102 to scan the region exterior 14. By aligning the LiDAR module 32 with the substantially flat portion 102, the infrared light received and/or emitted by the LiDAR module 32 may have limited distortion. For example, the substantially flat portion 102 may refer to a part of the outer lens 18 having no radius of curvature (e.g., flat). In other examples, the radius of curvature is between 2 meters and 5 meters (between 6.7 and 16.4 feet). In some examples, the radius of curvature at the substantially flat portion 102 is at least 4.5 meters (14.8 feet). Substantially flat may refer to being within 25%, 10%, 5%, 1%, or less of the radial ranges.

The projection surface 34 of the LiDAR module 32 may be aligned with and facing the substantially flat portion 102. For example, infrared light reflected off of the region exterior 14 may be directly received at the LiDAR module 32 without a mirror incorporated in the lamp assembly 10.

Figure 8A:
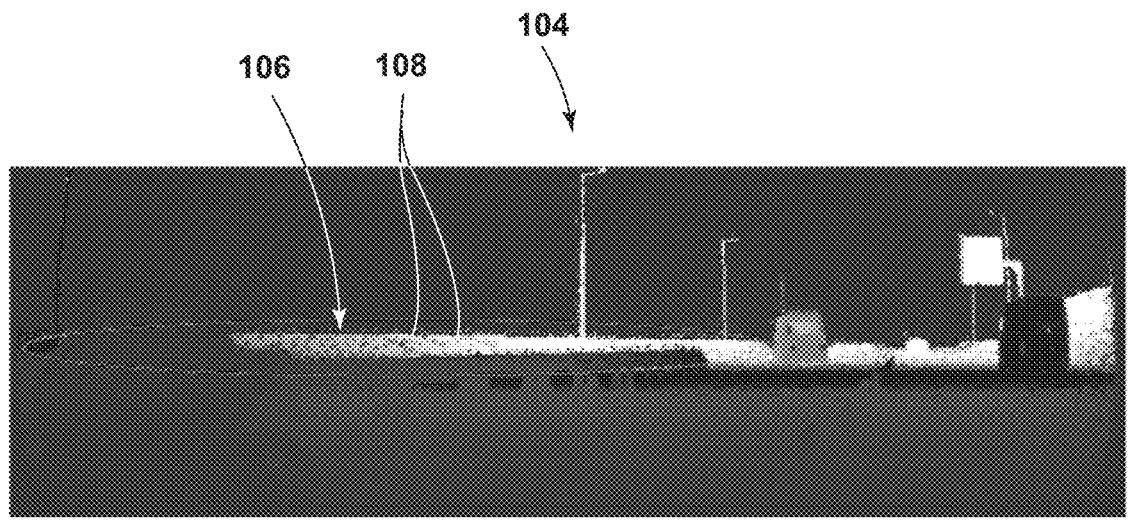
FIG. 8A is an unfiltered image of a region exterior to a vehicle and generated based on data captured by a LiDAR module of the lamp assembly.
Figure 8B:
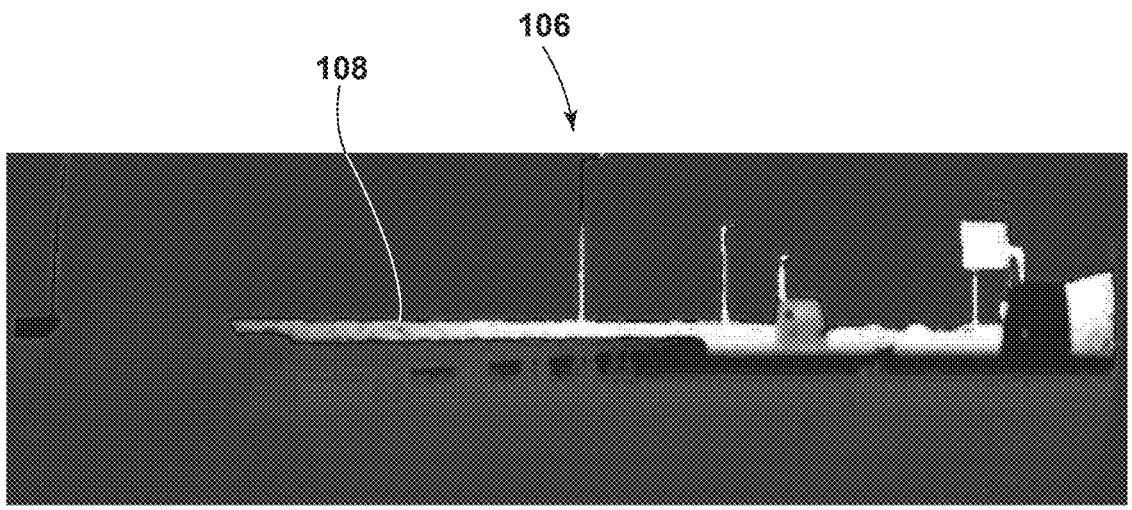
FIG. 8B is the image of FIG. 8A filtered by a controller communicatively coupled with the LiDAR module.

Referring now to FIGS. 8A and 8B, an exemplary image generated by the LiDAR controller 90 may be filtered at the controller as demonstrated in the pixelation differences between FIGS. 8A and 8B. For example, a peripheral region 106 of a first image 104 generated with limited or no filtering may include distortion in the form of representing a plurality of spaced objects instead of a single object. As demonstrated in FIG. 8B, the distortion may be removed from the peripheral region 106 by the LiDAR controller 90 in a second image 107. For example, the LiDAR controller 90 may be configured to process the first image 104 in a neural network to detect the distortion (e.g., stray pixels 108) and remove the distortion. Via the socket 80 previously described, the LiDAR controller 90 may be in wired electrical communication with other control systems for the vehicle 12. By providing clean image data and/or depth information to the other control system(s), the present arrangement may provide enhanced ranging and detection.

The lamp assembly 10 may provide for water and dust resistance for LiDAR detection, a maximized field of view 36, and space enhancement. For example, instead of a pair of light sources being disposed in the first and second cavities 44, 46, respectively, a single light source operable in high—and low-beam functionality may be incorporated in the first cavity 44, and the LiDAR module 32 may be incorporated in the second cavity 46. As previously described, the first cavity 44 may be disposed below the second cavity 46. Alternatively, the first cavity 44 is disposed above the second cavity 46.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A lamp assembly for a vehicle, comprising:
   a housing;
   an outer lens operably coupled with the housing to define a chamber therebetween;
   a light source disposed in a first portion of the chamber and configured to emit visible light through the outer lens to a region exterior to the vehicle;
   a LiDAR module disposed in a second portion of the chamber and facing the outer lens, the LiDAR module configured to capture distance information based on infrared light reflected from the region exterior, wherein the second portion is vertically spaced from the first portion;
   an inner lens disposed between and separating the first and second portions; and
   a bezel between the housing and the outer lens and defining a first cavity overlaying the light source and a second cavity overlaying the LiDAR module, wherein the bezel defines a groove disposed between the first and second cavities and receiving the inner lens, wherein the outer lens is substantially flat in a field of view of the LiDAR module.

2. The lamp assembly of claim 1, wherein the first cavity is disposed below the second cavity.

3. The lamp assembly of claim 1, wherein the first cavity is disposed above the second cavity.

4. The lamp assembly of claim 1, wherein the LiDAR module is configured to emit and receive the infrared light through the substantially flat portion to scan the region exterior.

5. The lamp assembly of claim 1, further comprising:
   a controller electrically coupled with the LiDAR module and configured to filter depth information of the region exterior captured by the LiDAR module.

6. The lamp assembly of claim 1, further comprising:
   a positioning controller communicatively coupled with the light source and configured to communicate a signal to adjust a position of the light source.

7. The lamp assembly of claim 1, wherein the light source is configured to selectively operate in a low-beam mode and a high-beam mode to project the visible light through a first region of the outer lens aligned with the first portion of the chamber, and wherein the LiDAR module is configured to receive the infrared light through a second region of the outer lens separate from the first region.

8. The lamp assembly of claim 7, wherein the second region is aligned with the second portion.

9. The lamp assembly of claim 8, wherein the first region is vertically and laterally aligned with the first portion and the second region is vertically and laterally aligned with the second region.

10. A lamp assembly for a vehicle, comprising:
    a housing;
    an outer lens operably coupled with the housing to define a chamber therebetween;
    a light source disposed in a first portion of the chamber and configured to emit visible light through the outer lens to a region exterior to the vehicle; and
    a LiDAR module disposed in a second portion of the chamber and facing the outer lens, the LiDAR module configured to capture distance information based on infrared light reflected from the region exterior, wherein the second portion is disposed above the first portion, and wherein the light source is configured to project a beam of the visible light through a first region of the outer lens and the LiDAR module has a field of view intersecting with and defining a second region of the outer lens that is separate from the first region, wherein the outer lens is substantially flat in the field of view of the LiDAR module.

11. The lamp assembly of claim 10, further comprising:
a controller electrically coupled with the LiDAR module and configured to filter depth information of the region exterior captured by the LiDAR module.

12. The lamp assembly of claim 10, wherein the light source is configured to selectively operate in a low-beam mode and a high-beam mode to project the visible light through a first region of the outer lens aligned with the first portion of the chamber.

13. The lamp assembly of claim 12, wherein the second region is aligned with the second portion.

14. The lamp assembly of claim 13, wherein the first region is vertically and laterally aligned with the first portion and the second region is vertically and laterally aligned with the second region.

15. A lamp assembly for a vehicle, the lamp assembly comprising:
a housing;
an outer lens operably coupled with the housing to define a chamber therebetween;
a light source disposed in a first portion of the chamber and configured to emit visible light through the outer lens to a region exterior to the vehicle;
a LiDAR module disposed in a second portion of the chamber and facing the outer lens, the LiDAR module configured to capture distance information based on infrared light reflected from the region exterior;
a bezel between the housing and the outer lens and defining a first cavity overlaying the light source and a second cavity overlaying the LiDAR module, wherein the second portion is disposed above the first portion; and
an inner lens disposed between and separating the first and second portions; wherein the bezel defines a groove disposed between the first and second cavities and receiving the inner lens, wherein the outer lens is substantially flat in a field of view of the LiDAR module.

* * * * *